Aug. 16, 1927.
D. FOLB
1,639,404
DENTAL FLASK
Filed May 8, 1926
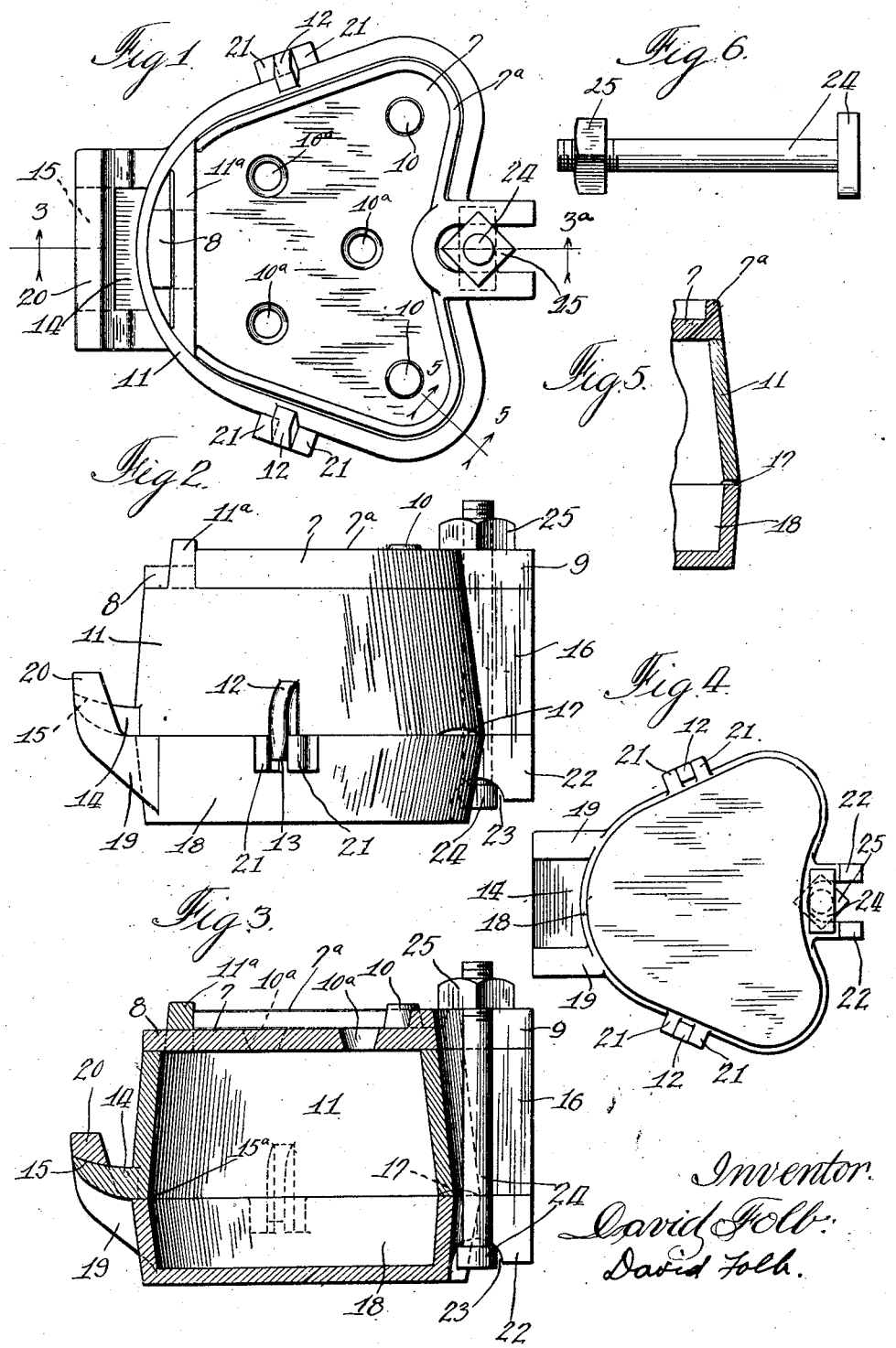
Inventor
David Folb
David Folb Patented Aug. 16, 1927.

1,639,404

UNITED STATES PATENT OFFICE.

DAVID FOLB, OF AKRON, OHIO.

DENTAL FLASK.

Application filed May 8, 1926. Serial No. 107,812.

The present invention relates to what are known as dental or dentists' flasks, and the object thereof is to provide improved means for locking the separate parts of a flask of this class together, and which may be conveniently manipulated for the purpose specified and also for the purpose of disconnecting the parts of the flask, and with this and other objects in view the invention consists of the construction, combination and arrangement of parts hereinafter described and claimed.

In the drawing:

Fig. 1 is a top plan view of the flask embodying the features of this invention.

Fig. 2 is a side elevation thereof,

Fig. 3 is a vertical section therethrough taken substantially on the line 3—3 of Fig. 1.

Fig. 4 is a bottom plan view of the device,

Fig. 5 is a vertical section through one corner of the device,

Fig. 6 is an elevation of the bolt and nut for holding the parts together.

In the accompanying drawing I have shown a dental flask of the form now in general use, and which comprises a bottom part 18, a top body part 11 and a cap plate 7.

The bottom body part 18 is provided on its rear walls with a pair of outwardly spaced parallel projecting arms 22, the bottom edges of which are notched as at 23. A pair of spaced parallel lugs 21 project outwardly from each side of the bottom body part 18 adjacent the upper edge thereof. A loop member 20 projects forwardly from the bottom body part 18 and the sides thereof are angular as is indicated at 19 to project upwardly. The lower edge of the intermediate portion of the loop 20 is beveled downwardly and inwardly towards the bottom body portion 18 as is indicated at 15.

The top body part 11 is provided at its rear with a pair of spaced parallel arms 16 one above each arm 22 to be disposed in substantially the same plane therewith. A pair of hooks 12 project outwardly and downwardly from the sides of the top body part 11 and their extremities are adapted to be received between the lugs 21 as is indicated at 13. A tongue 14 projects forwardly from the top body part 11 and is curved upwardly for engaging the edge 15 in the loop 20.

The cap plate 7 provided on its upper edge with a flange 7ª which is disposed along the sides thereof and the rear thereof. A tongue 8 extends from the forward edge of the cap plate 7 through a loop 11ª formed on the upper edge of the top body part 11. A pair of knobs 10 are provided on the cap plate 7 one in each rear corner and rise slightly above the upper edge of the flange 7ª as is shown clearly in Figs. 2 and 3. The cap plate is provided with three openings 10ª which are tapered downwardly as is clearly illustrated in Fig. 3 and allow the surplus plaster to project therethrough. From the rear of the cap plate 7 there project two arms 9 in spaced parallelism one above each arm 16 and in the same planes therewith. A bolt 24 is adapted to be disposed in the space between the arms 9, 16 and 22, the head of the bolt being oblong and receivable in the notches 23 and the nut 25 is screwed on the upper end of the bolt for securely holding the parts of the flask together. The lower edges of the wall forming the top body portion is provided with notches 17 at the rear corners thereof as is clearly illustrated in Figs. 2 and 5.

It is thought that the construction, utility, and advantages of this invention will now be clearly understood without a more detailed description thereof.

Having thus described my invention, what I claim as new is:

1. A dental flask of the class described including, in combination, a bottom body part, a top body part and a cap plate, means at the rear of the parts and plate to hold them together, a loop-like frame projecting forwardly and upwardly from the front of the bottom body part, and a tongue projecting forwardly from the bottom portion of the front of the top body part to be received in the loop-like frame.

2. A dental flask of the class described including, in combination, a bottom body part, a top body part, and a cap plate, means at the rear of the flask for fastening some of the parts and the plate, a loop-like frame projecting forwardly and upwardly from the front of the bottom body part, a tongue projecting forwardly from the bottom portion of the front of the top body part to be received in the loop-like frame, a second loop-like frame rising from the top body part, and a tongue projecting forwardly from the cap plate into the second loop-like frame.

3. A dental flask of the class described including, in combination, a bottom body part, a top body part, and a cap plate, means at the rear of the parts and the plate to hold them together, a loop-like frame projecting forwardly and upwardly from the front of the bottom body part, and a beveled tongue projecting forwardly from the bottom portion of the front of the top body part to receive the loop-like frame.

DAVID FOLB.